(12) United States Patent
Hawksworth et al.

(10) Patent No.: US 11,644,089 B2
(45) Date of Patent: May 9, 2023

(54) TELESCOPIC BALLSCREW ACTUATOR

(71) Applicant: Goodrich Actuation Systems Limited, Solihull (GB)

(72) Inventors: Andrew Hawksworth, Moreton (GB); Antony Morgan, Penn Wolverhampton (GB); James Holding, Cannock (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 17/506,203

(22) Filed: Oct. 20, 2021

(65) Prior Publication Data

US 2022/0034389 A1 Feb. 3, 2022

Related U.S. Application Data

(63) Continuation of application No. 16/016,778, filed on Jun. 25, 2018, now Pat. No. 11,174,923.

(30) Foreign Application Priority Data

Jun. 28, 2017 (EP) ..................................... 17178314

(51) Int. Cl.
| | |
|---|---|
| *F16H 25/20* | (2006.01) |
| *F02K 1/76* | (2006.01) |
| *F16H 25/22* | (2006.01) |
| *F16H 25/24* | (2006.01) |
| *F02K 1/15* | (2006.01) |

(52) U.S. Cl.
CPC .............. *F16H 25/20* (2013.01); *F02K 1/763* (2013.01); *F16H 25/2056* (2013.01); *F16H 25/2204* (2013.01); *F16H 25/2454* (2013.01); *F02K 1/15* (2013.01); *F05D 2220/323* (2013.01); *F05D 2260/57* (2013.01); *F05D 2270/66* (2013.01); *F16H 2025/2059* (2013.01)

(58) Field of Classification Search
CPC ............... F16H 25/2056; F16H 25/205; F16H 25/2204; F16H 25/2454; F16H 25/20; F16H 2025/2059; F02K 1/763
See application file for complete search history.

(56) References Cited

U.S. PATENT DOCUMENTS

| | | |
|---|---|---|
| 3,203,269 A | 8/1965 | Perrine |
| 4,144,851 A | 3/1979 | Prosen |
| 5,035,094 A | 7/1991 | Legare |

(Continued)

OTHER PUBLICATIONS

Extended European Search Report for International Application No. 17178314.5 dated Jan. 3, 2018, 7 pages.

*Primary Examiner* — Daniel D Yabut
(74) *Attorney, Agent, or Firm* — Cantor Colburn LLP

(57) ABSTRACT

An apparatus for a thrust reverser actuation system ("TRAS"), the apparatus comprising: an input shaft; a first component located concentrically around the input shaft; a second component located concentrically around the first component; a first ballscrew mechanism between the input shaft and the first component, and configured such that rotational movement of the input shaft causes a translational movement of the first component via the first ballscrew mechanism; and a second ballscrew mechanism between the first component and the second component, and configured such that rotational movement of the first component causes a translational movement of the second component via the second ballscrew mechanism.

2 Claims, 4 Drawing Sheets

(56) References Cited

U.S. PATENT DOCUMENTS

| | | |
|---|---|---|
| 5,069,081 A | 12/1991 | Morita |
| 5,092,539 A | 3/1992 | Caero |
| 5,431,539 A | 7/1995 | Carvalho |
| 6,494,033 B1 | 12/2002 | Davies |
| 9,086,035 B2 | 7/2015 | Jones |
| 9,562,595 B2 | 2/2017 | Caruel et al. |
| 9,685,838 B2 | 6/2017 | Ueyama et al. |
| 9,933,058 B1 | 4/2018 | Muster |
| 2004/0069084 A1 | 4/2004 | Dubus et al. |
| 2004/0173041 A1 | 9/2004 | Said |
| 2013/0213006 A1 | 8/2013 | Jones |
| 2014/0245743 A1 | 9/2014 | Caruel et al. |
| 2014/0290403 A1 | 10/2014 | Wu |
| 2015/0097455 A1 | 4/2015 | Ueyama et al. |
| 2016/0108852 A1 | 4/2016 | Caruel |
| 2016/0229546 A1 | 8/2016 | Chavignier et al. |
| 2018/0087634 A1 | 3/2018 | Muster |
| 2019/0003562 A1 | 1/2019 | Hawksworth et al. |

TELESCOPIC BALLSCREW ACTUATOR

CROSS-REFERENCE TO RELATED APPLICATIONS

This application is a continuation of U.S. application Ser. No. 16/016,778 filed Jun. 25, 2018, which claims priority to European Patent Application No. 17178314.5 filed Jun. 28, 2017, the disclosures of which are incorporated herein by reference in their entirety.

FIELD

The present disclosure relates generally to actuators for use in aerospace applications (e.g., an aircraft), such as a thrust reverser actuation systems ("TRAS") and/or a variable area fan nozzle ("VAFN"), and specifically a new type of telescopic ballscrew actuator for use in such systems.

BACKGROUND

Thrust reversers are provided on jet engines typically to increase the amount of braking on an aircraft upon landing. When deployed, a thrust reverser will change the direction of thrust of the jet engine such that some or all of the thrust is directed forwards, which acts to slow the aircraft so that it can then taxi off the runway.

There are a number of types of thrust reverser, all of which must be stowed during normal aircraft operation, for example so that the thrust reverser cannot be deployed during take-off or at a cruise altitude and can only be deployed during landing. In order to ensure this, one or more lock members are provided to prevent unwanted deployment of the thrust reverser, and in particular the actuators that move the various parts of the thrust reverser assembly.

New aerospace engine nacelle systems are being developed to increase engine efficiency (e.g., increased fuel burn with reduced drag) and reduce engine emissions (noise). To support these new types of nacelle, new nacelle architectures (e.g., reduced length) and system configurations (e.g., alternative thrust reverser kinematics) are being designed and developed. These new nacelle architectures and systems require the thrust reverser actuation system to be fitted into a significantly smaller installation envelope on the nacelle, whilst providing increased stow and deploy strokes, all the while maintaining the performance characteristics of previous systems.

It is desired to improve the actuator in a thrust reverser actuation system, and this is the aim of the present disclosure.

SUMMARY

In accordance with the invention, there is provided an apparatus for use in an aircraft (e.g., an aircraft thrust reverser), the apparatus comprising: an input shaft; a first component located concentrically around the input shaft; a second component located concentrically around the first component; a first ballscrew mechanism between the input shaft and the first component, and configured such that rotational movement of the input shaft causes a translational movement of the first component via the first ballscrew mechanism; and a second ballscrew mechanism between the first component and the second component, and configured such that rotational movement of the first component causes a translational movement of the second component via the second ballscrew mechanism.

The first ballscrew mechanism may comprise a screw thread located on an outer surface of the input shaft and a cooperating screw thread located on an inner surface of the first component.

The outer surface of the input shaft and the inner surface of the first component may be circumferential surfaces of the input shaft and the first component, respectively.

The second ballscrew mechanism may comprise a screw thread located on an outer surface of the first component and a cooperating screw thread located on an inner surface of the second component.

The outer surface of the first component and the inner surface of the second component may be circumferential surfaces of the first component and the second component, respectively.

The input shaft may be fixed against axial movement.

In a first mode the first component may be configured to translate along an axis upon rotational movement of the input shaft, and in a second mode the first component may be configured to rotate about the axis.

In the first mode the second component may be configured to translate with the first component along the axis.

In the second mode the second component may be configured to translate along the axis due to the operation of the second ballscrew mechanism.

A stop may be located on the first component that is configured, in the first mode, to abut the second component so as to cause the second component to translate with it along the axis as aforesaid.

The apparatus may be configured such that the first mode and the second mode occur sequentially, so as to provide two separate and distinct translational movements of the second component.

The first mode may occur prior to the second mode, and a transition between the first mode and the second mode may be caused by a stop attached to the first component abutting a stop attached to the input shaft, which abutment prevents further translation of the first component such that further rotational movement of the input shaft causes the first component to start rotating and the second component to translate along the axis due to the operation of the second ballscrew mechanism.

The second mode may occur prior to the first mode, and the transition between the second mode and the first mode may be caused by a stop attached to the second component abutting a stop attached to the first component, which abutment prevents further translation of the second component such that further rotational movement of the input shaft causes the first component to start translating and the second component to translate with it along the axis.

References to "translating" and "rotating" as used herein and above may be with reference to the longitudinal axis of any one of the input shaft, first component, second component, first ballscrew mechanism or second ballscrew mechanism. The input shaft, first component, second component, first ballscrew mechanism and second ballscrew mechanism may all comprise the same longitudinal axis.

In accordance with the invention, there is provided an actuator for an aircraft and comprising an apparatus as described above and herein.

In accordance with the invention, there is provided a thrust reverser actuation system ("TRAS") or variable area fan nozzle ("VAFN") comprising an apparatus as described above and herein.

In accordance with the invention, there is provided a method of operating an actuator of an aircraft, comprising: rotating an input shaft of the actuator about an axis to cause a first component to translate along the axis due to operation of a first ballscrew mechanism; and rotating the first component about the axis to cause a second component to translate along the axis due to operation of a second ballscrew mechanism.

The actuator may be part of an apparatus as described above.

BRIEF DESCRIPTION OF THE DRAWINGS

Various embodiments will now be described, by way of example only, and with reference to the accompanying drawings in which.

DETAILED DESCRIPTION

The broad concept of the present disclosure is a thrust reverser actuator that utilises two ballscrew components that are arranged concentrically and achieve a defined actuator stroke, with a reduced installation length compared to existing technologies.

Conventional technologies may use only a single ballscrew component to achieve a given actuator stroke, and the presently described technology allows the thrust reverser actuator to be fitted in a shorter installation envelope offering size benefits to the engine nacelle whilst maintaining its performance characteristics.

Figure 1:
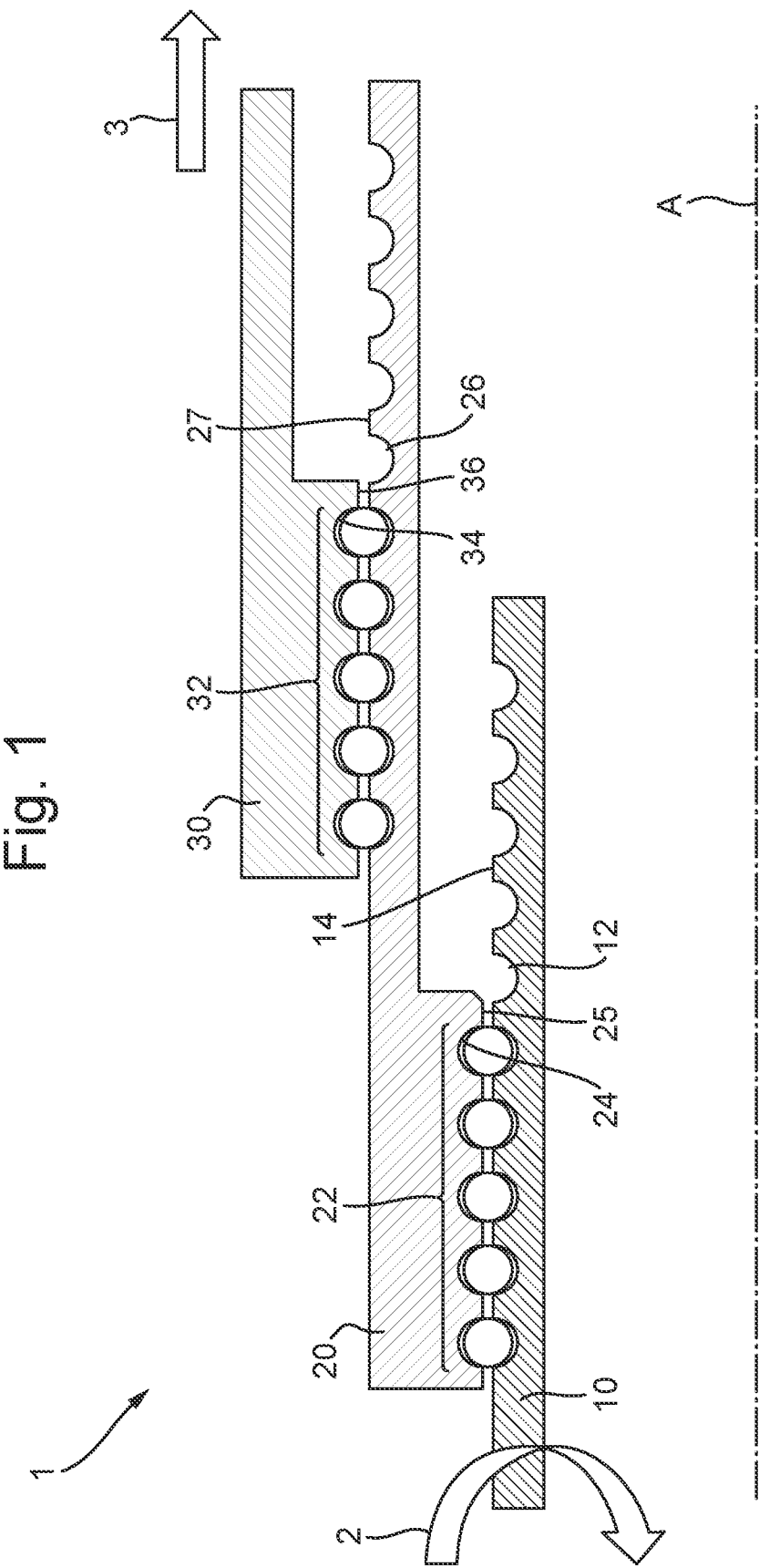
FIG. 1 shows schematically an embodiment of the present disclosure.

FIG. 1 shows an embodiment of the present disclosure, in which an apparatus 1 comprises an input shaft 10 that is rotatable about an axis A in a rotational direction 2. The input shaft 10 may be a rotating driveshaft of an actuator, and the axis A may be the longitudinal axis and/or rotational axis of the actuator. The input shaft 10 may be fixed in an axial direction, and may comprise a screw thread 12 that extends around an outer surface 14 of the input shaft 10.

A first component 20 is located concentrically around the input shaft 10, and a first ballscrew mechanism 22 is provided such that rotation of the input shaft 10 applies a force to the first component 20 in a direction of actuation 3, via the first ballscrew mechanism 22, to actuate a component (e.g., deploy a thrust reverser cowl). As will be discussed in more detail below, this will cause the first component 20 to move, either axially along the axis A, or rotationally around the axis A to drive the component.

The first component 20 comprises a first screw thread 24 that extends around an inner surface 25 of the first component 20. Thus, the first ballscrew mechanism 22 comprises the screw thread 12 of the input shaft 10, as well as the first screw thread 24 of the first component 20. Upon rotation of the input shaft 10, the first ballscrew mechanism 22 will operate by forcing balls of the first ballscrew mechanism 22 around a track formed by the screw thread 12 of the input shaft 10 and the first screw thread 24 of the first component 20. As is known, the balls may be captured and recycled (e.g., through recycling tubes), as the first component 20 translates along the axis A.

The first component 20 further comprises a second screw thread 26 that extends around an outer surface 27 of the first component 20, and forms part of a second ballscrew mechanism 32 (described below).

A second component 30 is located concentrically around the input shaft 10 and the first component 20. A second ballscrew mechanism 32 is provided, which is formed by the second screw thread 26 of the first component 20 and a screw thread 34 that extends around an inner surface 36 of the second component 30.

The second component 30 is fixed against rotational movement, and as such will be caused to move in the direction of actuation 3 upon axial or rotational movement of the first component 20. That is, upon axial or rotational movement of the first component 20, the first component 20 will apply an axial force to the second component 30 via the second ballscrew mechanism 32.

If the first component 20 is translating (as opposed to rotating) along the axis A, then the second component 30 will also move axially with the first component 20.

If the first component 20 is rotating, then the second ballscrew mechanism 32 will operate by forcing the balls of the ballscrew mechanism around a track formed by the second screw thread 26 of the first component and the screw thread 34 of the second component 30. The balls may be captured and recycled (e.g., through recycling tubes) as is known generally in the art.

As briefly discussed above, due to the configuration of the apparatus 1 described above, different operational sequences may occur upon rotation of the input shaft 10 depending mainly on the frictional forces between the various components.

In a first operational sequence, input rotation may be provided (e.g., by an electric or hydraulic motor) to the input shaft 10. Rotation of the input shaft 10, which is axially fixed, may result in translation of the first component 20 via the first ballscrew mechanism 22. Translation of first component 20 results in translation of the second component 30 (which is rotationally fixed) via the second ballscrew mechanism 32. The second ballscrew mechanism 32 may be restrained in rotation, for example, by a clevis attachment to a fixed structure (e.g., a fixed nacelle). Translation of the second component 30 results in translation of the component to which the actuator is attached.

In the second operational sequence, rotation of the input shaft 10 may result in rotation of the first component 20 (rather than translation as discussed above), which means that the second component 30 is initially driven to translate along the axis A by the translation of the first component 20. Subsequently, and once the first component 20 reaches the end of its travel (e.g., reaches a stopper as described below), the first component 20 will begin to rotate, resulting in further translation of the second component 30 due to the rotation of the first component 20.

It will be appreciated that the operational sequences of the apparatus 1 are not limited to the first and second operational sequences discussed above, and it is possible that operational sequences of the apparatus 1 involve other sequences.

In any of the operational sequences, the first component 20 and the second component 30 each have a certain amount of travel. However, translations of the first component 20 and the second component 30 do not have to occur sequentially, as described above. Rather, the apparatus 1 may be configured such that the translations of the first component 20 and the second component 30 alternate a plurality of times during rotation of the input shaft 10 to actuate the component.

Figure 2:
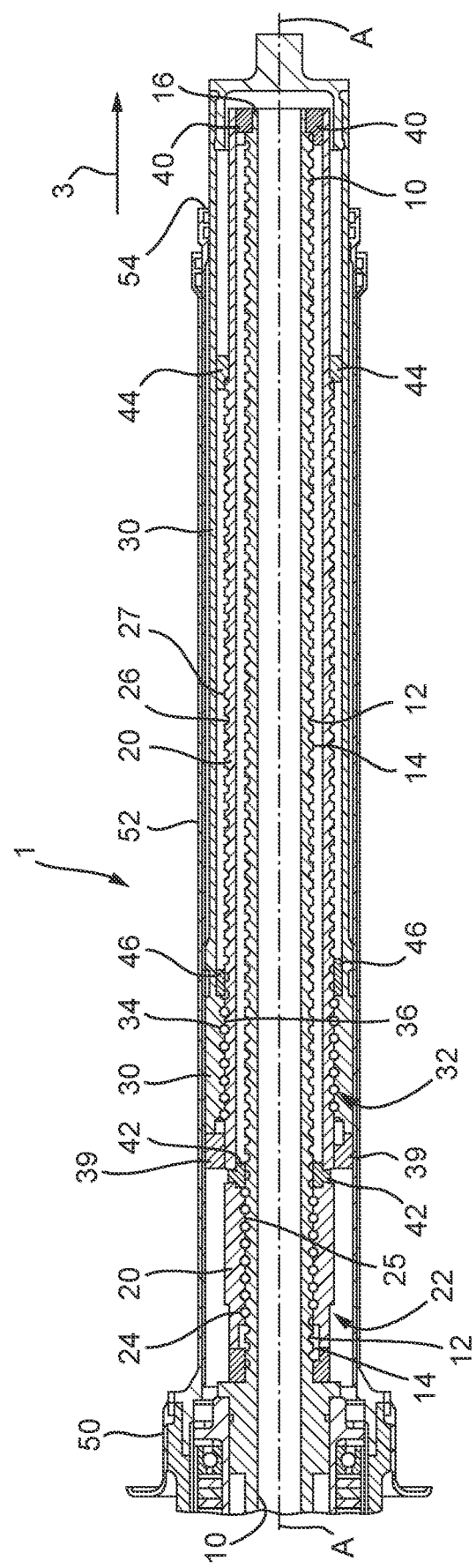
FIG. 2 shows an embodiment of the present disclosure in further detail.

FIG. 2 shows an embodiment of the present disclosure in further detail, and within an actuator assembly 50, which houses the apparatus 1. Reference numerals in FIG. 2 correspond to the same components as those described with the same reference numerals in respect of FIG. 1.

As can be seen from FIG. 2, the apparatus 1 fits inside the actuator assembly 50, with the second component 30 being slidably received within an extended portion 52 of the actuator assembly 50. The first component 20 is also contained within the extended portion 52, and the input shaft 10 is partially received within the extended portion 52.

In use, the first component 20 and the second component 30 protrude and extend from an open end 54 of the actuator assembly 50. As discussed above, the input shaft 10 is fixed against axial movement and does not change its axial position with respect to the extended portion 52.

In order to control the translation of the first component 20 and the second component 30, and plurality of stops are provided. Each stop is fixed to one of the input shaft 10, first component 20 and second component 30, and cooperates with another stop to limit the stroke of each of the first component 20 and the second component 30.

The discussion/example below assumes that the apparatus 1 operates in line with the first operational sequence described above.

A first stop 39 is connected to the first component 20 and may be located around the outer surface 27 of the first component 20 and/or axially between the first ballscrew mechanism 22 and the second screw shaft 26 of the first component 20. The first stop 39 is configured to abut the second component 30 such that translation of the first component 20 along the axis A (i.e., upon rotation of the input shaft 10) causes the second component 30 to translate along the axis A.

A second stop 40 is connected to the input shaft 10, for example at a distal end 16 thereof, and cooperates with a third stop 42 that is connected to the first component 20 (e.g., at an inner surface thereof and adjacent to the first ballscrew mechanism 22).

As the first component 20 moves in the direction of actuation 3, the third stop 42 moves progressively closer to the second stop 40 and will eventually abut the second stop 40. At this point, further movement of the first component 20 in the direction of actuation 3 is prevented, since the second stop 40 is connected to the input shaft 10, which is fixed against axial movement (i.e., along axis A). As such, the first component 20 will begin to rotate due to the engagement of the second stop 40 and the third stop 42, resulting in axial movement of the second component 30 (which, as discussed above, is fixed against rotational movement).

A fourth stop 44 is connected to the first component 20 (e.g., at an outer surface thereof), for example at the end of the second screw thread 26 of the first component 20, and cooperates with a fifth stop 46 that is connected to the second component 30 (e.g., as an inner surface thereof and adjacent to the second ballscrew mechanism 32).

Continued rotation of the input shaft 10, and first component 20 causes the second component 30 continue to translate in the direction of actuation 3, such that the fifth stop 46 moves progressively closer to the fourth stop 44 and eventually abuts the fourth stop 44 once the second component 30 has reached its maximum stroke.

It will be appreciated that the same arrangement can operate in the second operational sequence described above. This would depend on the frictional forces between the various components.

For example, if input shaft 10 rotates and passes a load to the first component 20 via the first ballscrew mechanism 22, it may be that the load is not enough to overcome the frictional forces (which may depend on the design of the particular ballscrew mechanism used) between the screw thread 12 of the input shaft 10 and the first screw thread 24 of the first component 20, and other parts of the first ballscrew mechanism, e.g., the balls. In this case, the load may be passed to the second ballscrew mechanism 32. If the frictional forces between the components of the second ballscrew mechanism 32 are sufficiently small, then the first component 20 will initially rotate with the input shaft 10, causing the second component 30 to translate along the axis A.

The second component 30 may translate until the fifth stop 46 reaches the fourth stop 44, at which point the load passed to the second ballscrew mechanism 32 cannot translate the second component 30, and the rotation of the input shaft 10 will begin to translate, rather than rotate the first component 10. The first component 20 will then translate along the axis A until the third stop 42 reaches the second stop 40. At this point the actuator will have reached its maximum stroke (which is the same for either operational sequence).

As will be appreciated, the translation of the second component 30 may be effectuated in two modes of operation. In a first mode, the first component 20 may translate upon rotation of the input shaft 10, causing the second component to translate, either using a stop (e.g., first stop 39) as in the first operational sequence, or using relative frictional forces between the ballscrew mechanisms as in the second operational sequence. In a second mode, the first component 20 may rotate upon rotation of the input shaft 10, causing the second component 30 to translate via the ballscrew arrangement of the first ballscrew mechanism 22.

Regardless of the sequence of the above modes of operation, the overall stroke of the actuator, and the stroke of the actuator during either mode of operation will be the same.

This telescopic arrangement means that the extended portion 52 of the actuator assembly 50 can be fitted in a shorter installation envelope than conventional arrangements that do not utilise multiple ballscrew mechanisms, offering size benefits to the engine nacelle whilst maintaining its performance characteristics.

It will be appreciated that the present disclosure is not limited to the use of two ballscrew mechanisms, and it is possible that any number of ballscrew components may be provided, with suitable ballscrew mechanisms between adjacent ballscrew components (in the same manner as described above in respect of FIGS. 1 and 2), to achieve a defined actuator stroke depending on the installation envelope and specific requirements of particular systems.

Figure 3:
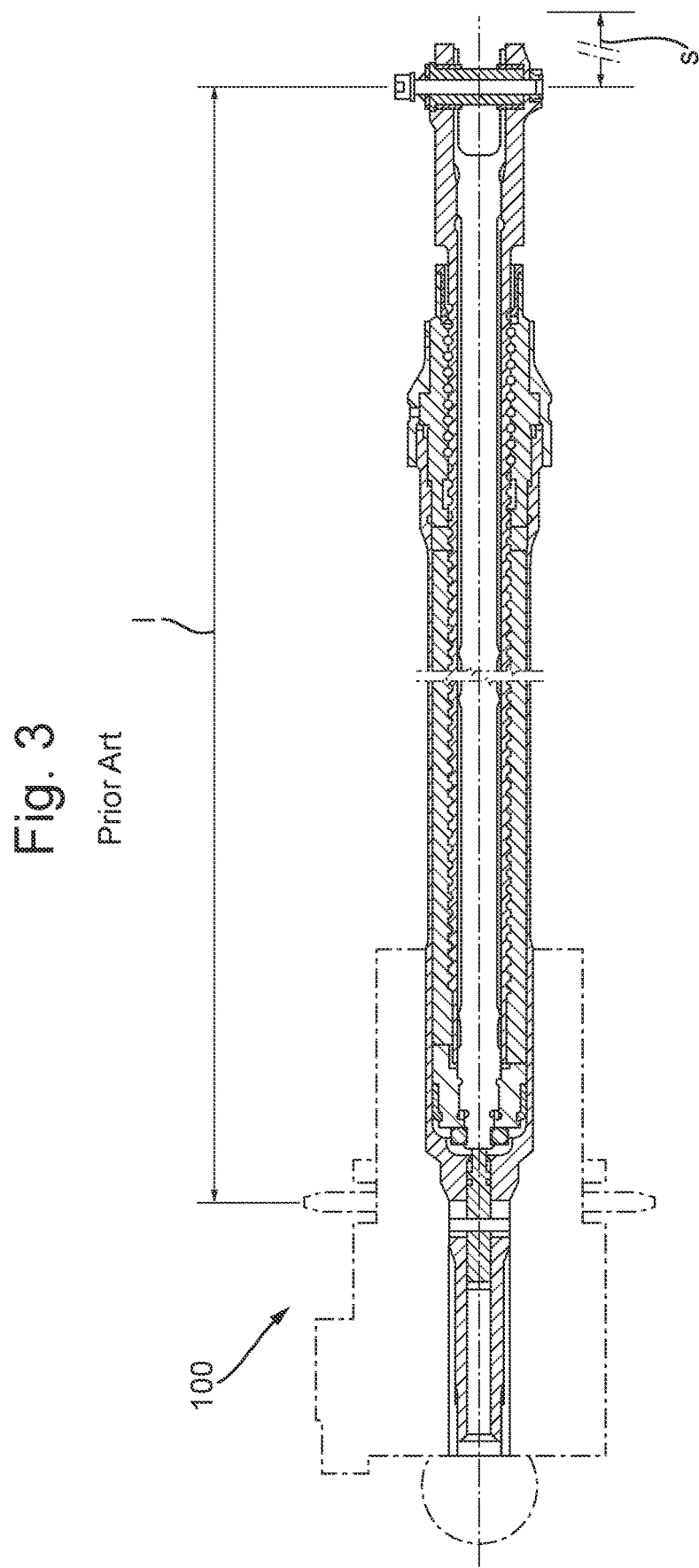
FIG. 3 shows a conventional arrangement.

FIG. 3 shows an example of a conventional actuator 100 that uses a single ballscrew component, which may have an installation length l of about 39 inches, and a stroke s of about 28 inches.

Figure 4:
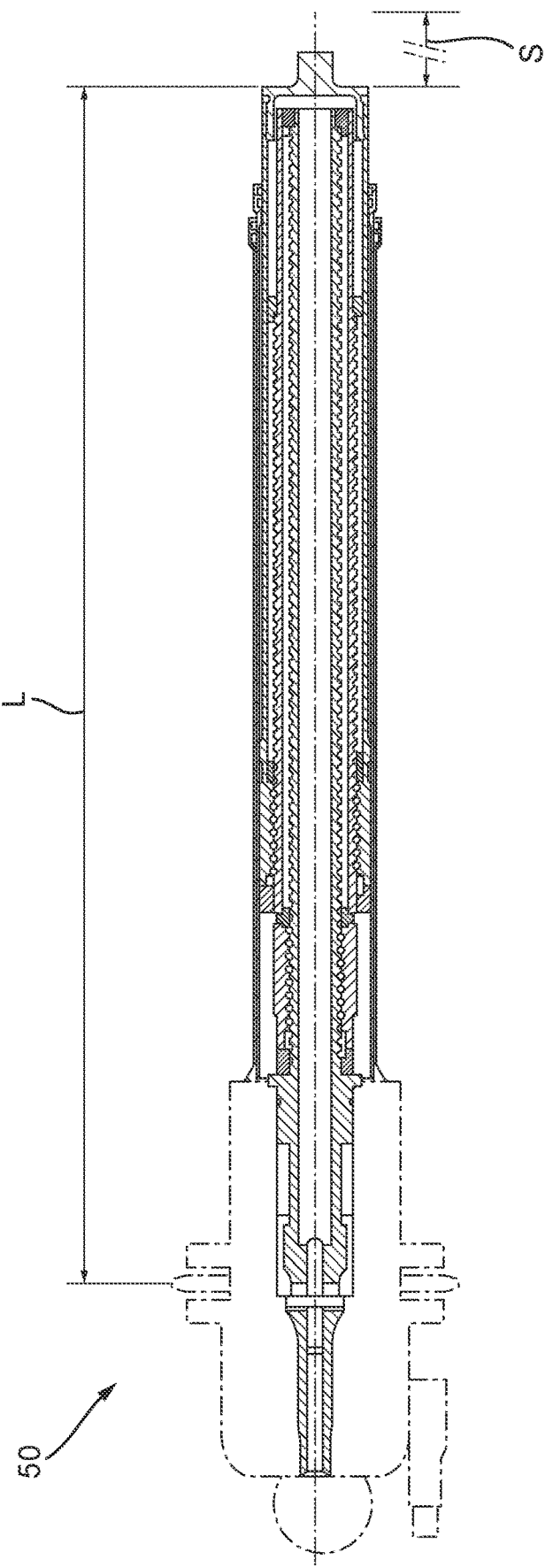
FIG. 4 shows the embodiment of FIG. 2 as it fits into a thrust reverser actuator.

FIG. 4 shows an example of an actuator assembly 50 in accordance with the present disclosure (e.g., corresponding to the actuator assembly 50 described above in respect of FIG. 2) that has an installation length L of about 27 inches, and a stroke S equal to that of the conventional actuator 100 of about 28 inches.

Although the present invention has been described with reference to preferred embodiments, it will be understood by those skilled in the art that various changes in form and detail may be made without departing from the scope of the invention as set forth in the accompanying claims. For example, and as discussed above, any number of ballscrew components and ballscrew mechanisms may be used to provide a telescopic actuator that reduces the installation length of a previously employed conventional actuator.

Furthermore, the technology disclosed herein may be used in other aircraft or aerospace applications, for example a variable area fan nozzle ("VAFN") or other nacelle actuation systems.

What is claimed is:

1. An actuator for use in an aircraft, the actuator comprising:
    an input shaft;
    a first component located concentrically around the input shaft;
    a first ballscrew mechanism between the input shaft and the first component, and configured such that in a first mode rotational movement of the input shaft passes a load to the first component via the first ballscrew mechanism, wherein the load overcomes frictional forces between the input shaft, the first component and the first ballscrew mechanism, so as to cause a translational movement of the first component via the first ballscrew mechanism; characterised in that the actuator comprises:
    a second component located concentrically around the first component; and
    a second ballscrew mechanism between the first component and the second component, and configured such that in a second mode rotational movement of the input shaft passes a load to the first component via the first ballscrew mechanism, wherein the load does not overcome frictional forces between the input shaft, the first component and the first ballscrew mechanism so as to cause a rotational movement of the first component which passes the load to the second ballscrew mechanism and so causes a translational movement of the second component via the second ballscrew mechanism,
    wherein in the first mode the first component is configured to translate along an axis upon rotational movement of the input shaft, and in the second mode the first component is configured to rotate about the axis, wherein an operational sequence of the first mode and the second mode is caused by said frictional forces between the input shaft, the first component and the first ballscrew mechanism.

2. A method of operating an actuator of an aircraft, comprising:
    in a first mode, rotating an input shaft of the actuator about an axis to pass a load to a first component via a first ballscrew mechanism, the load overcoming frictional forces between the input shaft, the first component and the first ballscrew mechanism so as to cause the first component to translate along the axis due to operation of the first ballscrew mechanism; and
    in a second mode, rotating the input shaft to pass a load to the first component via the first ballscrew mechanism, wherein the load does not overcome frictional forces between the input shaft, the first component and the first ballscrew mechanism thereby rotating the first component about the axis to cause a second component to translate along the axis due to operation of a second ballscrew mechanism,
    wherein an operational sequence of the first mode and the second mode is caused by relative frictional forces between the first ballscrew mechanism and the second ballscrew mechanism.

* * * * *